United States Patent [19]

Segawa

[11] 4,208,879
[45] Jun. 24, 1980

[54] INJECTION MOLDING MACHINES

[75] Inventor: Kazuyoshi Segawa, Zama, Japan

[73] Assignee: Toshiba Kikai Kabushiki Kaisha, Tokyo, Japan

[21] Appl. No.: 876,684

[22] Filed: Feb. 10, 1978

[30] Foreign Application Priority Data

Feb. 15, 1977 [JP] Japan .................. 52-15259

[51] Int. Cl.² ............................................. B60T 13/00
[52] U.S. Cl. .................... 60/547 R; 60/416;
60/563; 60/593; 91/27; 91/438; 92/85 B;
164/314
[58] Field of Search ............ 60/547 R, 563, 564,
60/593, 416, 565; 91/6, 27, 436, 437, 438, 189
R; 92/60, 85 B; 164/314

[56] References Cited
U.S. PATENT DOCUMENTS

| 1,930,155 | 10/1933 | Wiedmann | 60/563 |
| 2,030,966 | 2/1936 | Crane | 60/563 |
| 2,994,345 | 8/1961 | Strader | 91/436 |
| 3,068,596 | 12/1962 | Hein | 91/436 |
| 3,596,561 | 8/1971 | Keller | 91/436 |
| 4,066,189 | 1/1978 | Toyoaki | 91/27 |

*Primary Examiner*—Abraham Hershkovitz
*Attorney, Agent, or Firm*—Koda and Androlia

[57] ABSTRACT

In an injection molding machine of the type comprising an injection cylinder, a feedback circuit for feeding back the oil in the rear chamber of the injection cylinder into the front chamber thereof and a booster cylinder, a pressure oil accumulator is connected to the booster cylinder through a valve for supplying pressurized oil for actuating the booster cylinder. A check valve is connected in parallel with the valve. When water hammer occurs at the end of the injection stroke the check valve opens to absorb the energy of water hammer by the accumulator.

7 Claims, 4 Drawing Figures

INJECTION MOLDING MACHINES

BACKGROUND OF THE INVENTION

This invention relates to an injection molding machine in which molten metal or plasticized material is injected into a mold at high speeds and under high pressures.

There are three types (a), (b) and (c) of the injection machines generally used in the past. These types will be described briefly with reference to FIGS. 1 to 3 of the accompanying drawings.

(a) Simple Injection Machine

This machine comprises a simple cylinder connected to a pressure system. Thus, as shown in FIG. 1, an injection cylinder 2 containing an injection piston 3 is connected to an accumulator 1 which contains oil or other liquid under high gas pressure. The oil in the accumulator 1 is supplied to cylinder 2 via conduits 5, 6, and 7 and a direction transfer valve 4. When this valve is in position Z as shown in FIG. 1, the oil is supplied to cylinder 2 to advance the injection piston 3 at a high speed. When valve 4 is switched to position Y, the advance speed of piston 3 is made smaller than that produced when valve 4 is at position Z. When valve 4 is moved to position X, the piston 3 is retracted by connecting the lefthand side of piston 2 to an oil pump, not shown, through conduit H.

Although such simple injection machine is characterized in that its construction is simple and it can be operated readily, it is necessary to supply a large quantity of oil to cylinder 2 from accumulator 1 for effecting the injection stroke. For this reason, dangerous water hammer phenomenon is created due to the inertia of oil flowing through conduits 5, 6 and 7 at the time when the injection piston 3 stops upon completion of the injection stroke thereby creating a high peak pressure in the injection cylinder 2 which persists for a considerable time. As this pressure is transmitted to the molten metal in the mold through injection piston 3 flashes are formed on the resulting castings. When casting products having a large cross-sectional area the mold will be opened by the peak pressure.

(b) Injection Machine with Feedback Speed-Up Circuit. (hereinafter termed Run-Around System)

FIG. 2 shows a prior art run-around system in which elements corresponding to those shown in FIG. 1 are designated by the same reference characters. According to this system a feedback speed up circuit including conduits 8 and 9, and a shut off valve 10 is connected between the rear chamber B and the front chamber P of the injection cylinder 2 for feeding back the oil in the rear chamber B into the front chamber P when the injection piston 3 is moved in the forward direction. As will be described later, the shut off valve 10 is fully opened during the forward stroke of the injection piston 3 but closed by a spring when a back pressure release valve opens. When the injection piston 3 is to be retracted, transfer valve 4 is moved to position X so as to supply pressurized oil to the shut off valve 10 through conduit H, valve 4 and a pilot conduit 11 thereby closing the valve 10. A sequence valve 12 for relieving the back pressure is connected to the rear chamber B via conduit 14. Valve 12 is closed by a spring when the injection piston 3 moves in the forward direction but when the injection piston completes its injection stroke, the pilot pressure applied to valve 12 via pilot conduit 13 becomes larger than the force of the spring. Accordingly, the sequence valve 12 is opened to discharge the oil in the rear chamber B into a reservoir through conduits 14, 12, 15 and 16 thus increasing the pressure created by injection piston 3. A check valve 17 is connected in parallel with sequence valve 12 for supplying the pressurized oil to the rear chamber B when the transfer valve 4 is moved to position X for retracting the injection piston 3.

With this run around system, when the injection piston 3 is moved forwardly, the oil in the rear chamber B is fed back into the fore chamber P so that it is possible to provide a high speed injection operation by supplying a relatively small quantity of oil to the injection cylinder 2 from accumulator 1. Upon completion of the injection operation, the feedback speed up circuit is interrupted while at the same time the back pressure in the rear chamber B is released thereby applying a high pressure to the molten metal injected into the mold.

This run around system is more advantageous than the simple injection machine in that it is free from the water hammer phenomenon and can provide high injection speed with less quantity of the operating fluid. However, as it takes a relatively long time of from several tens to several hundreds milliseconds before the pressure applied to the molten metal can increase after completion of the injection operation, the temperature of the molten metal would decrease during such interval thus making it impossible to apply sufficiently high pressure to the molten metal. For this reason, it is impossible to obtain satisfactory products. Moreover, while the run around system is more advantageous than the simple injection machine in that the water hammer phenomenon is small, due to the large weight of moving elements such as the injection piston and piston rod, a large moment of inertia would apply a high peak pressure to the molten metal injected into mold.

(c) Injection Machine with a Booster (booster system)

FIG. 3 shows a typical booster system in which elements corresponding to those shown in FIGS. 1 and 2 are designated by the same reference characters. The diameter of the injection cylinder 2 is made smaller than that of the simple injection machine and of the run around system so as to provide a high speed injection operation with a relatively small quantity of the operating liquid. In this system, a booster cylinder 20 is connected to the fore end of the cylinder 2 and contains a booster piston 21 having large and small diameter portions thereby increasing the fluid pressure in reverse proportion to the ratio of the areas on the high pressure side $P_1$ and on the low pressure side $P_2$. A sequence valve 22 is provided to control the circuit extending between the rear side of the large diameter portion of the booster piston 21 and the rear chamber of the injection cylinder 2 and the discharge conduit 15 through conduits 24 and 25 thereby controlling the time of initiating the operation of the booster piston 21. Upon completion of the injection stroke, the pressure in pilot conduit 23 increases so that sequence valve 22 is opened to move the booster piston 21 in the forward direction to increase the pressure. A check valve 26 is contained in the booster piston 21, and a check valve 17 is connected in parallel with the sequence valve 22 and used to introduce pressurized oil into the rear side of the booster piston 21 for retracting the same.

When direction transfer valve 4 is brought to the position shown in FIG. 3, the liquid in the accumulator 1 is supplied to the fore chamber $P_2$ of the injection cylinder 2 through conduits 5 and 6, direction transfer valve 4, conduit 7, and check valve 26 thus advancing the injection piston 3. During this stroke, the sequence valve 22 is held in its closed position by a spring so as to hold the booster piston 21 against foreward movement. When pouring of the molten metal in the mold is completed, the forward movement of the injection piston 3 terminates. Consequently, the sequence valve 22 is fully opened by the pressurized liquid supplied thereto via pilot conduit 23 thus permitting the booster piston 21 to move in the forward direction. The check valve 26 is closed to increase the pressure of the fluid contained in the chamber $P_2$ between piston 3 and the small diameter portion of the booster piston 21 to a pressure higher than the pressure of the liquid supplied from the accumulator 1 in proportion to the ratio between the areas of the large and small diameter portions of the booster piston 21.

In the booster system, the water hammer phenomenon and the injection piston 3 are smaller than those of the simple injection machine and the peak pressure created by the moment of inertia of the moving members is lower than that of the run around system but requires a time of from several tens to several hundreds milliseconds between completion of the injection stroke and build up of a sufficient pressure created by the booster piston 21 and acting upon the injected molten metal. For this reason, although it is possible to decrease the number of cast flashes to be less than that possible with the simple injection machine, satisfactory products cannot be obtained in the same manner as the run around system.

SUMMARY OF THE INVENTION

Accordingly, it is the principal object of this invention to provide an improved injection molding machine capable of eliminating various defects of the prior art injection molding machines.

Another object of this invention is to provide a new and improved injection molding machine capable of eliminating objectional water hammer phenomena.

Still another object of this invention is to provide an improved injection molding machine capable of varying the speed of the injection piston during the injection stroke thereof.

A further object of this invention is to provide a novel injection molding machine capable of eliminating troubles caused by adiabatic compression of gas remaining in the mold.

According to this invention, these and further objects can be accomplished by providing an injection molding machine of the type comprising an injection cylinder containing an injection piston, a feedback speed up circuit connected to the injection cylinder on the opposite sides of the injection piston, a high speed shut off valve connected in the circuit, a first source of pressurized liquid, a first valve means for admitting the pressurized liquid into the injection cylinder on one side of the injection piston, a booster cylinder connected to the injection cylinder on said one side for applying higher liquid pressure to the injection piston than the pressure in the first source of liquid pressure, said booster cylinder containing a booster piston including a large diameter portion and a small diameter portion extending into the injection cylinder on said one side, characterized by comprising a second source of pressurized liquid, and a second valve means connected between the second source of pressurized liquid and the booster cylinder.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 4:
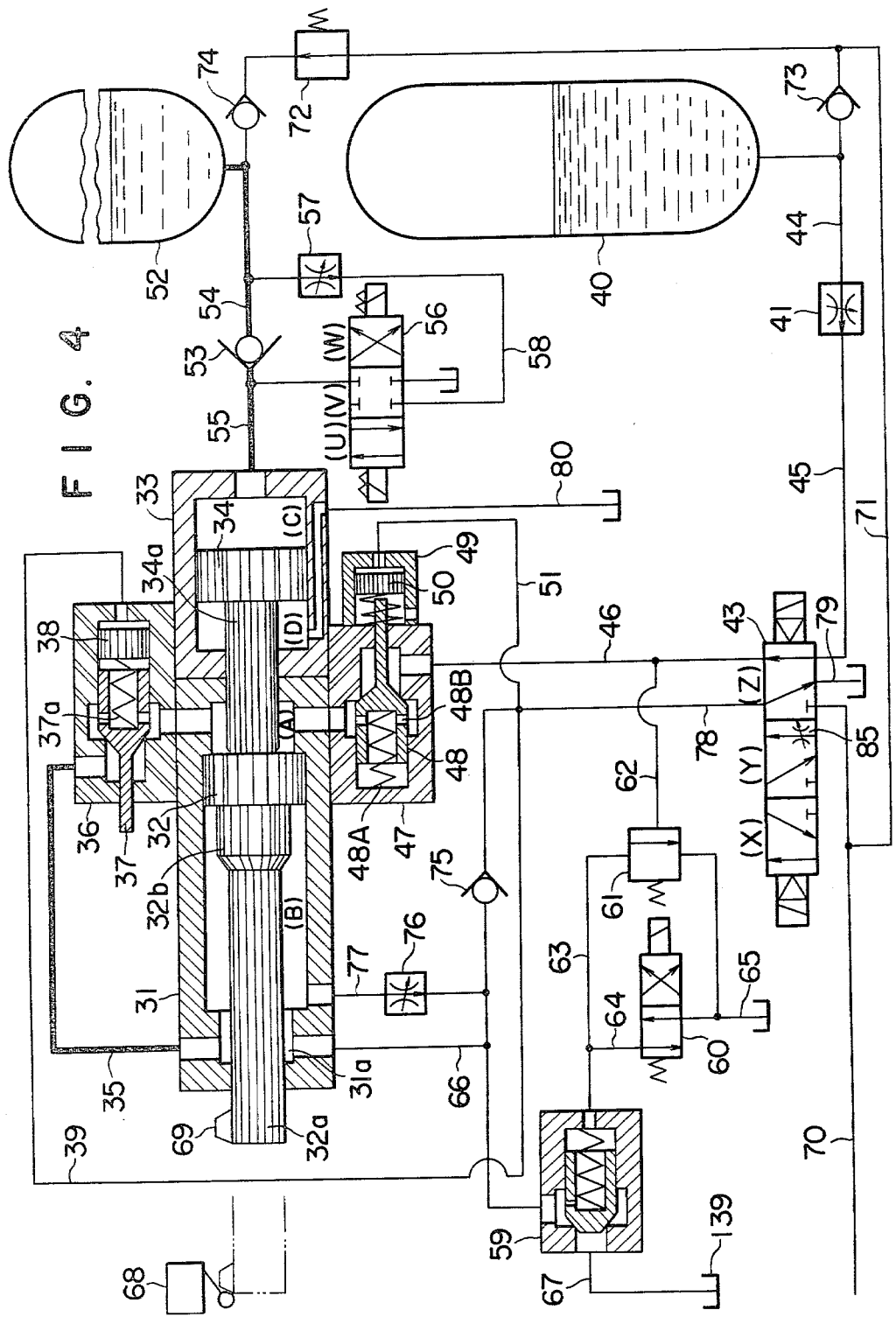
FIG. 4 is a diagram, partly in section, showing one embodiment of the injection molding machine according to this invention.

The injection molding machine of this invention shown in FIG. 4 comprises an injection cylinder 31, an injection piston 32 slidably contained therein, and a booster including a booster cylinder 33, a booster piston 34 having a large diamter portion slidably received in the booster cylinder 33, and a small diameter portion which extends into the front chamber A of the injection cylinder 31 for transmitting force between the injection cylinder 31 and the booster cylinder 33. When the injection piston 32 is retracted to its rearward limit so as to abut against the stepped portion as shown in FIG. 4, the booster piston 34a (i.e. 34) is pushed by the piston 32 and has a rest position intermediate the end positions of the booster cylinder 33 so as to cause some space to remain in the rearward chamber (c). At this moment, the pressurized liquid in the chamber (c) is returned into an accumulator 52 thereby absorbing the energy of the water hammer phenomenon. A feedback speed up circuit 35 is provided so as to feedback the oil in the rear chamber B in the injection cylinder 31 into the front chamber A thereof when the injection piston 32 is moved in the forward direction thereby enabling high speed injection with a small quantity of the operating oil supplied into the front chamber A from accumulator 40. In the circuit 35 is interposed a high speed shut off valve 36 containing a valve member 37 including large and small diameter portions and slidably contained in the valve casing. The end of the small diameter portion extends through the valve casing into atmosphere so that the area acted upon by the pressurized oil is smaller than the area on the large diameter side. Accordingly, valve 36 can be closed in an extremely short time. A pilot piston 38 is contained in valve 36 which is used to close the valve 37 by the pressure applied through pilot conduit 39 when the injection piston 32 is to be retracted.

Figure 1:
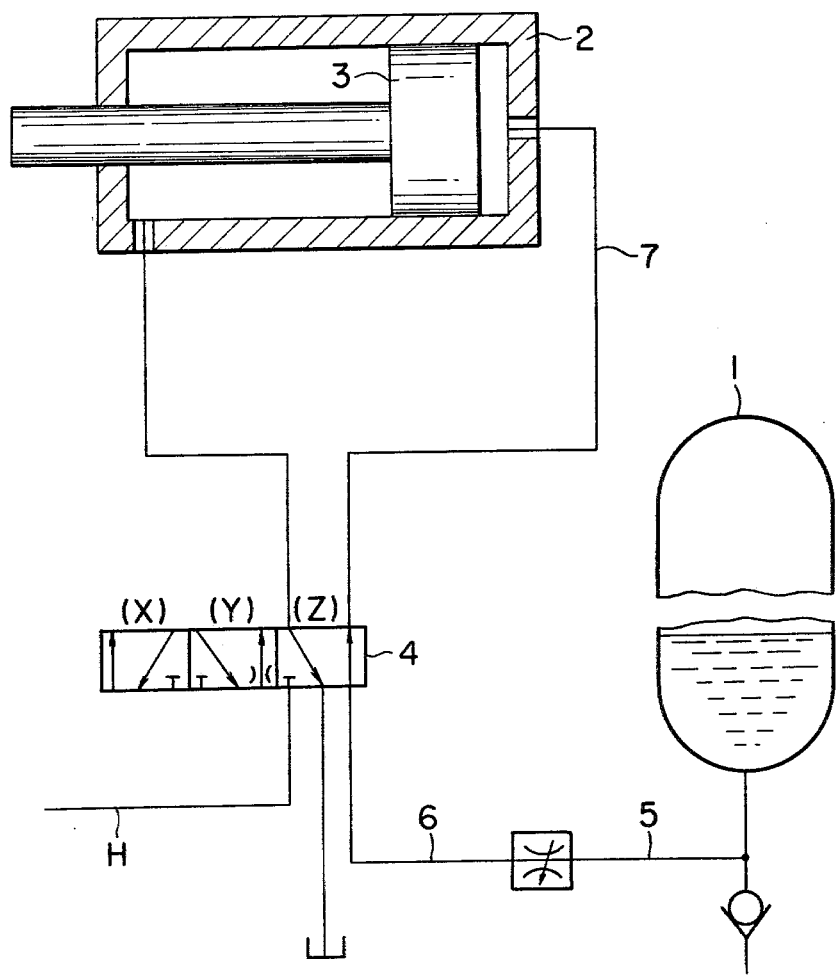
FIGS. 1, 2 and 3 show typical prior art injection molding machines.

An accumulator 40 similar to accumulator 1 shown in FIG. 1 is provided and the pressurized oil contained therein is supplied to the front chamber A of injection cylinder 31 via conduits 44, 45 and 46, a flow control valve 41, a direction transfer valve 43 which controls the direction and speed of the injection piston 32, and a high speed transfer valve 47 identical to valve 37 described above and containing a valve member 47. A pilot cylinder 49 is secured to one end of the high speed transfer valve 47 and contains a piston 50. The pilot cylinder 49 is connected to conduit 78 via a pilot conduit 51 so as to open the high speed transfer valve 48 when the injection piston 32 is to be retracted. An auxiliary accumulator 52 containing liquid and pressurized gas is provided for operating booster piston 34 and for absorbing water hammer phenomenon. A check valve 53 is connected in series with conduits 54 and 55 which interconnect the booster cylinder 33 and the auxiliary accumulator 52 for passing the liquid only from the booster cylinder to the auxiliary accumulator. A direction transfer valve 56 operated by an electric signal is connected across the check valve 53 in series with a flow control valve 57 and a conduit 58.

A pilot operated check valve 59 is connected between the rear chamber B of the injection cylinder 31 and a reservoir 139 through conduits 66 and 67. Accociated with the check valve 59 is a direction transfer valve 60 which discharges the liquid in the spring chamber of the check valve 59 or closes the spring chamber by an electric signal produced by, for example a limit switch, or a mechanical signal generated by a cam, for example for opening or closing the check valve 59 when a predetermined time has elapsed after initiation of the injection stroke of the injection piston 32. A sequence valve 61 is connected in parallel with the direction transfer valve 60. The sequence valve 61 is set to be opened by a pilot pressure supplied from conduit 46 through a pilot conduit 62 when the injection piston 32 completes its injection stroke and when the direction transfer valve 60 is not used. Reference numerals 58, 63 through 67, and 77 through 80 represent conduits connected as shown. A limit switch 68 is provided at an adjustable position to be operated by a dog 69 mounted on the injection piston rod 32a and an electric signal generated by this limit switch is used to operate the direction transfer valve 60. Conduits 70 and 71 connected to a source of pressure, for example, an oil pump not shown, supply pressurized oil to accumulators 40 and 52 through check valves 73 and 74 respectively. A pressure reducing valve 72 is provided to reduce the oil pressure supplied to accumulator 52. A flow control valve 76 is included in conduit 77 connected to the rear chamber B of the injection cylinder 31 for controlling the speed of the injection piston 32 when its reduced diameter portion enters into a cushioning opening 31a. Such cushioning mechanism is used only when the injection piston is moved in the forward and rearward directions without actually injecting molten metal for the purpose of adjusting the machine.

Figure 2:
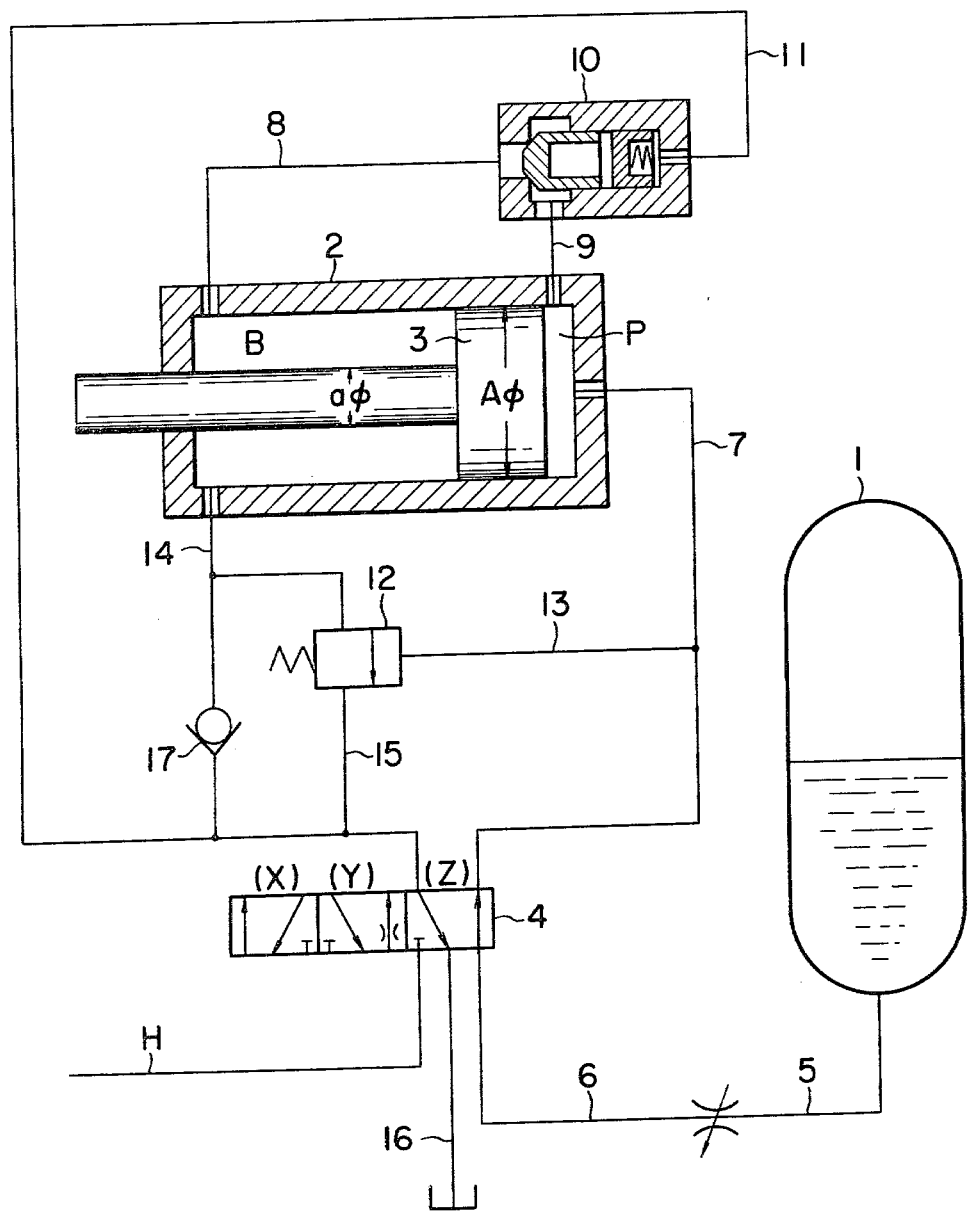
Figure 3:
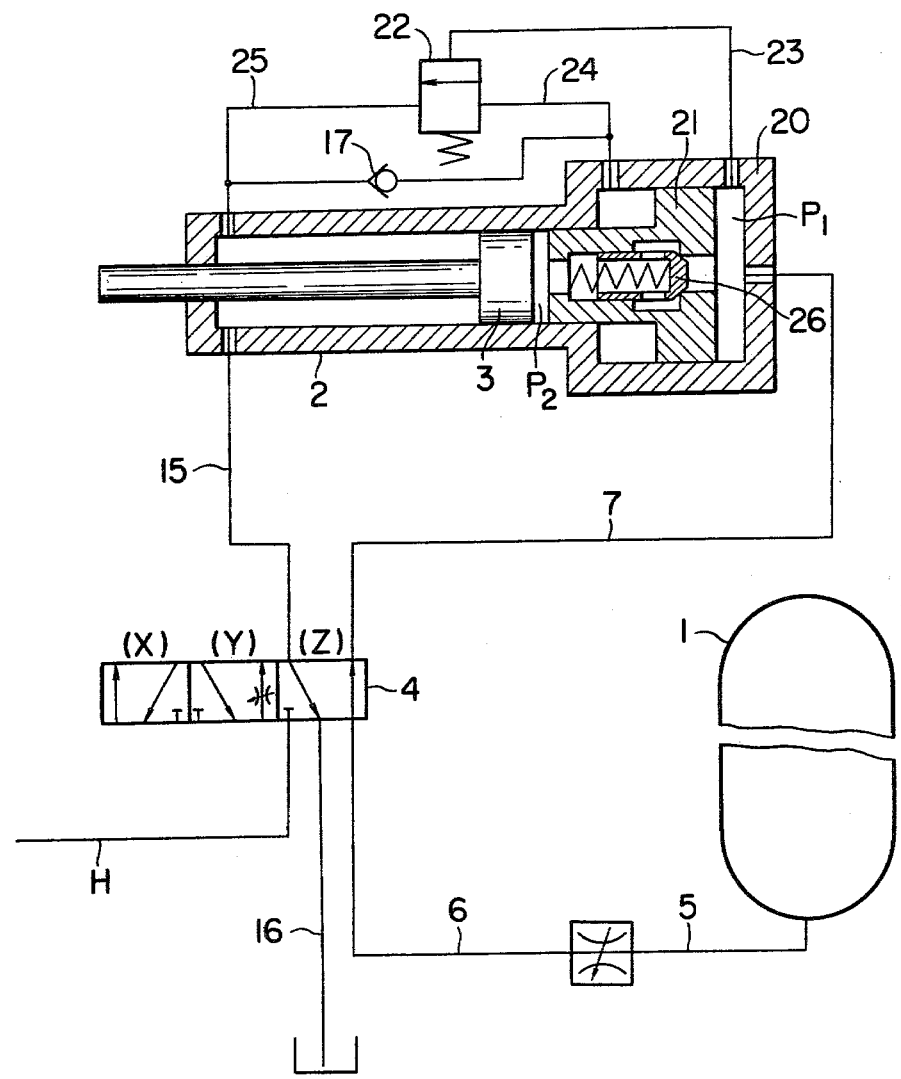

The injection machine of this invention operates as follows. The machine can perform the following injection operations which have been impossible with the prior art injection machines shown in FIGS. 1 to 3.

1. Ultra High Speed Injection-Application of Ultra High Pressure

When the direction transfer valve 43 is switched to position Z shown in FIG. 4, the pressurized oil in accumulator 40 is supplied at high speed into the front chamber A of the injection cylinder 31 via conduits 44, 45, flow control valve 41, the direction transfer valve 43, conduit 46 by moving the high speed transfer valve 48 to the left, whereby the injection piston 32 begins its injection stroke. At this time, since the sequence valve 61 and the direction transfer valve 60 are in the illustrated positions, pilot operated check valve 59 is also maintained in the closed position. Accordingly, the oil in the rear chamber B of the injection cylinder flows through conduit 35 to urge the high speed shut off valve 37 toward right with the result that the oil is fed back into front chamber A of the injection cylinder 31. For this reason, it is possible to move the injection piston at an ultra high speed by supplying only a small quantity of oil from accumulator 40 which is equal to (area of piston 32—area of piston rod 32a) X stroke of piston 32. Of course, the speed at this time can be adjusted to any desired value by flow control valve 41.

When the injection operation completes and the mold is filled with molten metal, the pressure in conduit 46 becomes equal to that in accumulator 40 so that sequence valve 61 opens thus opening the pilot operated check valve 59. Accordingly, the oil in the rear chamber B of the injection cylinder 31 is discharged into reservoir 139 through check valve 59 and conduits 66 and 67 and the pressure in the rear chamber B is decreased to the atmospheric pressure. Concurrently therewith, the high speed shut off valve 37 is closed by spring 37a and by the pressurized oil in the center of valve 37. Valve 48 is also closed at the same time as valve 37 by spring 48A and by the pressurized oil acting thereon through opening 48B. In other words, the pressurized oil acting on the larger cross-sectional area of the lefthand side of valve 48 acting together with spring 48A closes the valve 48. Thus, the oil in front chamber A of the injection cylinder 31 is sealed.

When the injection piston advances a predetermined distance, the direction transfer valve 56 is switched by an injection piston position responsive means to position W to supply the pressurized oil in the auxiliary accumulator 52 to chamber C of the booster cylinder 33.

Although in the foregoing description, the check valve 59 was opened when the mold has been filled with the molten metal, it is also possible to switch the direction transfer valve 60 by a limit switch or a timer, not shown, prior to the filling of the mold.

As above described, the booster piston 34 is maintained at about the center of the booster cylinder 36 before admission of the pressurized oil from auxiliary accumulator 52. Accordingly, when the injection piston 32 comes to a step of applying pressure to the molten metal in the mold after completion of its ultra high speed injection operation, the energy of the moment of inertia of the oil that has been supplied to front chamber A at high speed would be absorbed by moving the booster piston to the right for forcing back the oil in chamber C into the auxiliary accumulator 52. During this course, all related structures undergo elastic deformation to a level of completing the boosting operation. Thus, it is possible to complete the boosting operation at the time of completing the injection stroke without any time lag.

According to the injection machine of this invention, the water hammer phenomenon can be completely eliminated, and since a feedback speed up valve and a booster cylinder are combined with the injection cylinder it is possible to greatly decrease the mass and weight of such movable elements as the injection piston and the piston rod thereof than the prior art run around type. For this reason, even when the injection is done at ultra high speeds, the moment of inertia of the movable elements can be decreased greatly. Moreover, as will be described later, the booster operates at an ideal timing at the final stage of the injection molding so that it is possible to apply any desired pressure (including extremely high pressure) to the molten metal in the mold.

Moreover, according to this invention it is possible to eliminate dangerous water hammer phenomenon even when the injection is made at a such ultra high speed that can never be realized by the prior art injection molding machines. It is also possible to eliminate the time lag of boosting on the order of several tens to several hundreds milliseconds of the prior art machines.

(2) Ordinary High Speed Injection-Boosting

At this time, the direction transfer valve 43 is switched to position Y and the direction transfer valve 60 is then switched by the limit switch 68 at the end of the stroke of the injection piston to the other position (that is energized position) the pilot operated check valve 59 would be opened so as to prevent the oil in chamber B from feeding back into chamber A thus advancing the injection piston at a low speed. When the injection piston 32 advances to any desired position, the direction transfer valve 43 is switched to position Z by an injection piston position responsive means, and a predetermined time thereafter valve 56 is similarly switched to position W. Although according to this operation mode, the injection piston 32 operates in the order of low speed, high speed and boosting speed like the well known booster system, it is possible to eliminate the problem of water hammering and time lag of the booster.

(3) It is possible to vary speed during the injection stroke.

In a well known injection molding machine, the injection speed is low until an intermediate point is reached, then it is switched to high speed when the molten metal passes through the gate of the mold and finally high pressure is applied to the molten metal when it has filled the mold by the booster or the feedback system. In certain injection molding machines of the run around type a braking force is applied to the injection piston near the end of the injection stroke for the purpose of alleviating the moment of inertia thereof. With these prior art injection molding machines, it is impossible to inject at ideal speeds for a variety of types of the products, molds and molten metals. Thus, for example, high speed injection is advantageous for a combination of the shape and quality of the product, construction of the mold, type of the molten metal, the casting temperature thereof and other parameters whereas low speed is desirable for other combinations of these parameters. For another combination, it is advantageous to gradually increase the injection speed as the molten metal fills the mold. In still another case, it is desirable to gradually decrease the injection speed. Thus, the injection speed should be changed in accordance with the combination of various parameters described above.

To fullfil such requirements it has been the practice to use an oil pressure operated servovalve, but the time of injection is extremely short. As is well known in the art, the servovalve cannot respond to such extremely short time whereby it has been impossible to switch the injection speed from high to low or vice versa. In contrast, as above described according to this invention, it is possible to change as desired the injection speed during the injection stroke and this can never be attained by the prior art injection machines. In the following, for the sake of brevity, the speed is classified into low speed, medium speed, high speed and ultra high speed but these speeds have no definite ranges and it is possible to vary the speed smoothly in each range.

In FIG. 4, although shown diagrammatically, as is well known in the art, the transfer valve 43 is operated by electromagnetic means such as solenoid coils disposed on opposite ends thereof. When these solenoid coils are excited in a predetermined sequence, a spool is selectively moved to a position X, Y and Z, and the transfer valve 60 is also operated by solenoid coils disposed on the opposite ends thereof, and although the connection of liquid paths is the same when the direction transfer valve 43 is positioned at positions Y and Z, but as an adjustable orifice 85 is contained in position Y, the injection speed is low when the valve 43 is switched to position Y. When the direction transfer valve 60 is in the position shown in the drawing the feedback speed up circuit 35 is operative whereas when the valve 60 is moved to the other position by energizing its operating coil the pilot operated check valve 59 is opened to render inoperative the feedback speed up circuit 35. As a consequence, when the direction transfer valve 60 is in the position shown, the injection piston 32 is moved at a high injection speed but at a low speed when the direction transfer valve 60 is moved to the other position. Thus, it is possible to vary the injection speed in a manner described above by changing the order of operation and transfer positions of the direction transfer valves 43 and 60. The following are some examples of such variations.

1. Valve 43 is switched to position Y and valve 60 is switched to the other position (lefthand side) by energizing its coil.
2. Valve 43 is switched to position Y and valve 60 is switched to the position shown in FIG. 4.
3. Valve 43 is switched to position Z and valve 60 is switched to the other position.
4. Valve 43 is switched to position Z and valve 60 is switched to the position shown in FIG. 4.

By switching direction transfer valves 43 and 60 in the order mentioned, the speed of the injection piston 32 is varied in the order of low speed, medium speed, high speed and ultra high speed.

On the other hand, when the order of switching of the direction transfer valves 43 and 60 is changed to:

5. Valve 60 is switched to the position shown and the valve 43 is switched to position Y.
6. Valve 60 is switched to the position shown and the valve 43 is switched to position Z.
7. Valve 60 is switched to the other position and valve 43 is switched to position Z.
8. Valve 60 is switched to the other position and valve 43 is switched to position Y.

Then, the speed of the injection piston 32 is varied according to the order of medium speed, ultra high speed, high speed and low speed. As can be noted from the foregoing examples, the order of changing the injection speed can be varied variously by changing the order of switching of the direction transfer valves 43 and 60.

The following advantages can be afforded by varying the injection speed during the injection stroke in a manner described above. When the injection speed is made low at the initial stage and then increased while the molten metal is being poured into the mold, the molten metal would be poured at a speed that causes a laminae flow thus producing high quality products. In certain shapes of the product and mold it is difficult to exhaust the gas in the mold. If the injection speed were too fast near the end of the injection stroke, the temperature of the gas in the mold would increase above the temperature of the molten metal due to adiabatic compression thus causing seizure of the molten metal to the mold and shortening of the life thereof. This problem can be obviated by decreasing the injection speed near the end of the injection stroke. It will be clear that the number of injection speeds can be increased by increasing the number of direction transfer valves and that other types of transfer valves can be used.

With any order of changing the injection speed, when the injection piston 32 is stopped upon completion of the injection molding, the moment of inertia of the oil is absorbed by the auxiliary accumulator 52 through booster piston 34. In addition, as it is possible to switch the direction transfer valve 56 at any desired time it is possible to boost the pressure without any time lag or with a desired time lag. Furthermore, as it is possible to adjust the pressure in the auxiliary accumulator 52 to any value by the pressure reducing valve 72 it is possible to apply any desired pressure to the molten metal filled in the mold.

I claim:

1. In an injection molding machine of the type comprising an injection cylinder containing an injection piston, a feedback speed-up circuit connected in said injection cylinder on the opposite sides of said injection piston, a high speed shut-off valve connected in said circuit, a first source of pressurized liquid, a first valve means for admitting the pressurized liquid into said injection cylinder on one side of said injection piston, a booster cylinder connected to said injection cylinder on said one side for applying higher liquid pressure to said injection piston than the pressure in said first source of liquid pressure, said booster cylinder containing a booster piston including a larger diameter portion and a small diameter portion extending into said injection cylinder on said one side, the improvement which comprises a second source of pressurized liquid, and a second valve means connected between said second source of pressurized liquid and said booster cylinder, said second valve means comprising a direction transfer valve connected between said booster cylinder and said second source of pressurized liquid and a check valve connected in parallel with said transfer valve, said check valve opening to pass the pressurized liquid from said booster cylinder to said second source of pressurized liquid when said booster piston is moved backwardly, and said direction transfer valve operating to supply the pressurized liquid into said booster cylinder when said injection piston is moved forwardly.

2. The injection molding machine according to the claim 1 wherein said high speed shut-off valve comprises a valve body including a reduced diameter portion which extends through a valve casing of said high speed shut-off valve into atmosphere, and a spring housed in said valve body so as to momentarily close said high speed shut-off valve.

3. The injection molding machine according to claim 2 wherein said high speed shut off valve further comprises a pilot piston contained in the same casing as said valve body and said injection molding machine further comprises a pilot conduit for applying the pressure of the pressurized liquid in said first source to said pilot piston.

4. The injection molding machine according to claim 1 wherein said large diameter portion of said booster piston is maintained at a intermediate point along the axial length of said booster cylinder so as to cause some space to remain in the rear chamber of said booster cylinder when said injection piston is moved to the rearward limit thereby absorbing water hammer phenomenon which occurs at the end of said injection stroke by said second source of pressurized liquid.

5. The injection molding machine according to claim 1 wherein said first valve means comprises a first direction transfer valve connected between said first source of pressurized source and said injection cylinder on said one side for admitting and discharging pressurized liquid into and out of said injection cylinder, a check valve connected to said injection cylinder on the other side of said injection piston for discharging the pressurized liquid from said injection cylinder, a second direction transfer valve controling said check valve, and means for operating said first direction transfer valve and means for operating said second direction transfer valve thereby selectively performing the switching of the injection speed of said injection piston in accordance with the predetermined sequence.

6. The injection molding machine according to claim 1 wherein each of said first and second sources of pressurized liquid comprises a sealed accumulator containing said liquid and compressed gas.

7. An injection molding machine according to claim 1 which further comprises a high speed transfer valve connected between a front chamber of said injection cylinder and said first source of pressurized fluid and a pilot cylinder connected to said first valve means for operating said high-speed transfer valve.

* * * * *